United States Patent [19]
Lorenz et al.

[11] Patent Number: 5,992,314
[45] Date of Patent: *Nov. 30, 1999

[54] UV CURABLE ADHESIVE FOR STENCIL MEDIA

[75] Inventors: Michael A. Lorenz, Miamisburg; Joseph D. Roth, Springboro, both of Ohio

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,546

[22] Filed: Jun. 30, 1997

[51] Int. Cl.[6] ...................................................... B41C 1/14
[52] U.S. Cl. ................ 101/128.21; 428/195; 428/317.7; 156/241; 156/273.5; 156/275.7; 156/325
[58] Field of Search ............................... 101/127, 128.21, 101/128.4; 428/195, 211, 317.7, 913; 156/241, 273.3, 273.5, 275.5, 275.7, 325, 330

[56] References Cited

U.S. PATENT DOCUMENTS

| | | | |
|---|---|---|---|
| 4,628,813 | 12/1986 | Hasegawa et al. | 101/128.4 |
| 4,950,696 | 8/1990 | Palazotto et al. | 522/25 |
| 4,961,377 | 10/1990 | Bando et al. | 101/128.21 |
| 4,981,746 | 1/1991 | Matsuo et al. | 428/195 |
| 5,160,564 | 11/1992 | Hasegawa et al. | 156/231 |
| 5,243,906 | 9/1993 | Okusawa | 101/128.21 |
| 5,245,932 | 9/1993 | Ujiie | 101/128.21 |
| 5,270,099 | 12/1993 | Kamiyama et al. | 428/195 |
| 5,373,785 | 12/1994 | Yamamoto et al. | 101/116 |
| 5,389,701 | 2/1995 | Erickson | 522/158 |
| 5,415,090 | 5/1995 | Notori | 101/128.21 |
| 5,417,156 | 5/1995 | Tateishi et al. | 101/128.21 |
| 5,437,964 | 8/1995 | Lapin et al. | 430/280 |
| 5,438,347 | 8/1995 | Shishido et al. | 347/218 |
| 5,450,789 | 9/1995 | Hasegawa | 101/129 |
| 5,513,565 | 5/1996 | Hasegawa | 101/116 |
| 5,517,913 | 5/1996 | Oshio et al. | 101/119 |
| 5,522,313 | 6/1996 | Okusawa | 101/128.21 |
| 5,526,032 | 6/1996 | Nakamura | 347/211 |

FOREIGN PATENT DOCUMENTS

| | | |
|---|---|---|
| 0331748 | 9/1989 | European Pat. Off. . |
| 309968 | 11/1993 | Japan . |

OTHER PUBLICATIONS

English Translation of JP 5–309,968.
Patent Abstracts of Japan, vol. 013, No. 022 (M–786), Jan. 19, 1989 & JP 63 233890 A (Riso Kagaku Corp). Sep. 29, 1988.
Patent Abstracts of Japan, vol. 014, No. 276 (M–0984), Jun. 14, 1990 & JP 02 081691 A (Riso Kagaku Corp; Others: 01), Mar. 22, 1990.
Patent Abstracts of Japan, vol. 018, No. 119 (M–1567), Feb. 25, 1994 & JP 05 309968 A (Dainippon Printing Co Ltd), Nov. 22, 1993.
WPI Abstract Accession No. 93–410590/199351 & JP050309968A (Dainippon),Nov. 22, 1993 ( see abstract).
WPI Abstract Accession No. 90–142275/199019 & JP020081691A (Riso Chemical), Mar. 22, 1990 (see abstract).
WPI Abstract Accession No. 88–318113/198845 & JP630233890A (Riso Kagaku Kogyo), Sep. 29, 1988 (see abstract).
K. K. Dietliker, "Chemistry & Technology of UV & EB Formulation for Coatings, Inks & Paints", vol. 3, Selective Industrial Training Associates Ltd., London, U.K. (1991), pp. 275–298.
Ciba Geigy, "Radiation Curing of Polymers", The Royal Society of Chemistry, 1987, pp. 184–195.

*Primary Examiner*—Stephen R. Funk
*Attorney, Agent, or Firm*—Richard J. Traverso

[57] ABSTRACT

A thermal stencil master sheet for stencil printing has a porous substrate for absorbing ink and a thermoplastic resin film bound thereto by an adhesive. The stencil pattern is formed in both the film and adhesive. The adhesive comprises a thermoplastic resin derived from UV and visible light cured monomers, oligomers and mixtures thereof. In the method provided, thermal stencil master sheets are prepared by forming a liquid layer of adhesive between the porous substrate and the thermoplastic resin film and curing the liquid layer by exposure to UV or visible light.

13 Claims, 2 Drawing Sheets

UV CURABLE ADHESIVE FOR STENCIL MEDIA

BACKGROUND OF THE INVENTION

This invention relates to a thermal stencil master sheet for stencil printing, and more particularly, it relates to a thermal stencil master sheet obtained by adhering a thermoplastic resin film onto a porous substrate with an adhesive.

Thermal stencil master sheets provide stencils when placed in contact with a thermal print head of a thermal transfer printer or the equivalent thereof. The print head is activated as the stencil master sheet is scrolled by, creating perforations therein. These perforations permit the flow of ink from a mesh printing drone to a receiving substrate, creating a printed image that conforms to the stencil pattern.

Representative disclosures in the art of thermal stencil master sheets are as follows:

U.S. Pat. No. 4,628,813 issued to Hasegawa et al. describes a stencil duplicator which prepares a stencil master and prints with the stencil master. The means for making the stencil master includes apparatus for selective illumination with light.

U.S. Pat. No. 4,961,377 issued to Bando et al. describes a thermal stencil master sheet which employs a urethane adhesive.

U.S. Pat. No. 5,160,564 issued to Hasegawa et al. describes a process for producing a thermal stencil master sheet which protects the film from breakage by laminating thermoplastic films onto the surfaces of a base film, bonding porous substrates to the thermoplastic films and subsequently stripping the thermoplastic films with the porous substrates from the base film.

U.S. Pat. No. 5,245,932 issued to Ujiie describes a thermal stencil master sheet of allegedly high resolution through the use of different zones (contacting zones and clearance zones) on the thermoplastic resin.

U.S. Pat. No. 5,373,785 issued to Yamamoto et al. describes a mimeo graphic transfer printing machine, wherein ink is forced through the stencil supported on a stencil supporting drum.

U.S. Pat. No. 5,415,090 issued to Natori et al. describes a method for manufacturing a print master by forming perforations in a thermosensitive stencil paper.

U.S. Pat. No. 5,438,347 issued to Shishido et al. describes a device for making a thermal stencil master sheet within a stencil printer.

U.S. Pat. No. 5,450,789 issued to Hasegawa describes a stencil printing method which uses a plurality of stencil master plates which can be superimposed during printing to achieve color printing.

U.S. Pat. No. 5,513,565 issued to Hasegawa describes a stencil printing device with a plurality of printing drums for printing full color images.

U.S. Pat. No. 5,517,913 issued to Oshio et al. describes a stencil printing device which uses a sensor for detecting an ink type.

U.S. Pat. No. 5,522,313 and U.S. Pat. No. 5,243,906, both issued to Okusawa describes thermal stencil master plates, wherein an unprocessed portion includes swelled and solidified lumps of thermoplastic resin film said to avoid the expansion of the perforations.

U.S. Pat. No. 5,526,032 issued to Nakamura describes a method for processing a stencil master plate using a thermal head.

The thermal stencil master sheets are typically obtained by laminating a thermoplastic resin film onto a porous substrate such as a porous thin paper with an adhesive. A release layer is typically provided on the surface of the thermoplastic resin film to prevent adhesion of the film to the receiving substrate during use. The thermoplastic resin films used for the thermal stencil master sheets have varied to a limited extent. Polyester films, films of propylene copolymers and vinylidene chloride-vinyl chloride copolymer films have been said to be suitable. The composition of the porous substrate can vary widely and is said to include the thin paper of both natural and synthetic fibers. The adhesives presently being used include vinyl acetates, acrylics and rubbers. Various deficiencies of these particular adhesives include the need for solvents and dispersing agents. These components reduce productivity by lowering line speeds due to drying and solvent elimination. Another deficiency is the poor adhesive strength exhibited by some adhesives. The adhesive has many requirements which include the following:

1. the adhesive must permit the coating process to be carried out rapidly;
2. the adhesive must melt with the thermoplastic resin film when forming perforations; and
3. the adhesive must be resistant to solvents within the printing ink.

The use of organic solvents complicates compliance with environmental regulations and restrictions and also adds to the cost in that the solvent removed must be captured and/or incinerated. Suitable water-based adhesives have not been achieved and the use of hot melt adhesives is expected to cause problems with the thin thermoplastic resin film.

Vinyl acetate adhesives have been widely used due to their ease of handling. However, higher adhesive strength is desired. The thermal stencil master sheets with this adhesive suffer damage when in contact with the printing ink over an extended period, resulting in unclear printed images.

Alternatives to the vinyl acetates have been proposed, such as the urethane adhesives containing a urethane prepolymer as disclosed in U.S. Pat. No. 4,961,377. These adhesives are said to take from 24–48 hours to cure at room temperature following the addition of moisture (see column 4, lines 23–26). In addition, solvents are said to be employed when necessary to obtain a uniform coating. While these urethane adhesives accelerate the laminating process, complex procedures are required to prepare and use the urethane prepolymer. It is desirable to provide thermal stencil master sheets having an adhesive which is simple to prepare and use and provides stencils with high endurance.

Ultraviolet radiation curable coatings are known and most comprise a reactive oligomer or a reactive monomer, a photoinitiator and optional additives. UV curable coatings have many uses including photoimaging inks and photoresist technology. The use of coatings with UV/visible light curing components has several advantages when compared to solvent or aqueous based coatings. For example, there is no need to dry a coating of a photo-curable formulation applied to a substrate or capture/incinerate any organic solvents. Typically, all of the coating formulation forms the final coating and there are no losses from the evaporation of solvent.

Conventional photopolymerizable coatings can cure by a cationic mechanism or by a free-radical mechanism or both depending on the monomers and initiators used. Photopolymerizable monomers and oligomers which cure by a cationic curing mechanism are preferred. The cationic curing mechanism provides the following advantages:

(i) The cationic polymerization typically has no volatile by-products which can represent health hazards and/or produce an unpleasant odor.

(ii) The cationic polymerization, once activated, typically continues for some time in the absence of light (dark cure).

(iii) The cationic polymerization medium is very stable in the absence of light and typically can have a shelf-life of years if stored in a light-free environment.

SUMMARY OF THE INVENTION

It is an object of the present invention to provide a thermal stencil master sheet with an adhesive which does not require solvent removal, which is simple to prepare and use and provide a durable bond between the porous substrate and thermoplastic resin film.

It is an additional object of the present invention to provide a thermal stencil master sheet with an adhesive which comprises UV or visible light cured monomers.

It is a further object of the present invention to provide a thermal stencil master sheet having a reactive adhesive with features and qualities that can be adjusted through the selection of reactive components for the adhesive.

It is an additional object of the present invention to provide a method of preparing thermal stencil master sheets using, as the adhesive, reactive monomers and oligomers cured by photoinitiated polymerization.

Upon further study of the specification and appended claims, further objects and advantages of this invention will become apparent to those skilled in the art.

The above objects are achieved through the thermal stencil master sheet of this invention and the methods for preparing them provided by the present invention. The thermal stencil master sheets of the present invention comprise a thermoplastic resin film which can be perforated upon the application of heat from a thermal transfer print head (or the equivalent) operating at a temperature in the range of 100° to 260° C., a porous substrate which does not perforate upon application of heat form a thermal transfer print head operating at a temperature in the range of 100° to 260° C., and an adhesive which is perforated by a thermal transfer print head operating at a temperature in the range of 100° to 260° C., said adhesive comprising a thermoplastic resin formed by photopolymerization of monomers, oligomers or a mixture thereof and selected form the group consisting of epoxies, cyclic ethers, vinyl ethers, acrylates, acrylic acids, methacrylates and methacrylic acids.

The method for producing thermal stencil master sheets comprises:

a) forming a liquid layer between a porous substrate and a thermoplastic resin film with an adhesive formulation, and b) curing the liquid layer of the adhesive formulation to form a solid layer by exposure to UV or visible light, said adhesive formulation comprising:

i) at least one photopolymerizable monomer, oligomer or mixture thereof, selected from the group consisting of epoxies, cyclic ethers, vinyl ethers, acrylates, acrylic acids, methacrylates and methacrylic acids in an amount totaling at least 25 wt. % of said adhesive formulation;

ii) at least one cationic or free radical photo initiator which will initiate polymerization of the photopolymerizable monomer, oligomer or mixture thereof when exposed to UV or visible light.

The liquid layer of adhesive formulation can be formed between a porous substrate and a thermoplastic resin film, such as polyethylene terephthalate film, by coating either the porous substrate or the thermoplastic resin film with the adhesive formulation and laminating the other component onto the coating of adhesive. The laminate is exposed to UV or visible light to initiate polymerization of the monomers and oligomers in the coating of adhesive either before lamination, after lamination or both. This polymerization reaction turns the adhesive formulation into a solid layer. Driers are not required to remove solvent or other volatiles and substantially all of the adhesive formulation applied between the porous substrate and thermoplastic film remains. The method can be performed at ambient temperature and the adhesive formulation can be cured to a solid layer in less than 5 minutes.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE INVENTION

The thermal stencil master sheets of this invention comprise a porous substrate, a thermoplastic resin film and an adhesive which binds these components. A key element is the adhesive, which is formed from an ultraviolet radiation or visible light cured adhesive formulation. The adhesive formulation employed in preparing the thermal stencil master sheets of this invention, may generally be comprised of:

1. one of more photopolymerizable monomers and/or oligomers; and 2. at least one photoinitiator. Optional materials which adjust the flow temperature ($T_m$) of the adhesive, once cured, include additional binder components selected from waxes and thermoplastic resins and branching/crosslinking agents or chain terminating agents. Other optional materials include photosensitizers which enhance the response of the photopolymerizable monomers and/or oligomers to ultraviolet light or visible light and performance additives which enhance the properties of the resulting adhesive.

A key element to the adhesive formulation is the one or more photoinitiators employed. The starting of any photochemical reaction is the absorption of a photon by a compound which is promoted to an excited state, followed by the decomposition of the compound to a highly reactive entity. Compounds which ultimately form protic acids or Bronsted-Lawry acids upon exposure to UV and/or visible light are typically suitable for use as photointiators in the adhesive formulations that form the thermal stencil master sheets of this invention. Such compounds are commonly referred to as cationic photointiators. Most cationic UV photoinitiators absorb photon energy at a wavelength in the range of 150 to 450 nm. Compounds which form reactive-free radicals upon exposure to UV and/or visible light sufficient to initiate free-radical polymerization are also suitable for use as photoinitiators in this invention. Such compounds are commonly referred to as free-radical photointiators. There are a number of conventional free-radical photoinitiators and cationic photoinitiators which are suitable for use in this invention. Some of these are listed below:

| Chemical Nam | Trade Name | Supplier |
|---|---|---|
| Benzoin | Esacure BO | Fratelli Lamberti |
| | (2-hydroxy-1,2-diphenylethanone) | |
| Benzoin ethyl ether | Daitocure EE | Siber Hegner |
| | (2-Ethoxy-1,2-diphenylethanone) | |
| Benzoin isopropyl ether | Vicure 30 | Stauffer |
| | Daitocure IP | Siber Hegner |
| | 2-Isopropoxy-1,2-diphenylethanone) | |
| Benzoin n-butyl ether | Esacure EB1 | Fratelli Lamberti |
| | (2-Butoxy-1,2-diphenylethanone) | |
| Mixture of benzoin butyl ethers | Trigonal 14 | Akzo |
| Benzoin iso-butyi ether | Vicure 10 | Stauffer |
| | Esacure EB2 | Fratelli Lamberti |
| | Daitocure IB | Siber Hegner |
| | (2-Isobutoxy-1,2-diphenylethanone) | |
| Blend of benzoin n-butyl ether and benzoin isobutyl ether | Esacure EB3 | Fratelli Lamberti |
| | Escure EB4 | |
| Benzildimethyl ketal (BDK) | Irgacure 651 | Ciba-Geigy |
| | Lucirin BDK | BASF |
| | Esacure KB1 | Fratelli Lamberti |
| | Esacure KB60 | Fratelli Lamberti |
| | (60% solution in methylene chloride) | |
| | Micure 3K-6 | Miwon |
| | Hicure BDK | Kawaguchi |
| | (2,2-Dimethoxy-1,2-diphenylethanone) | |
| 2,2-Diethoxy-1,2-diphenyiethanone | Ulvatone 8302 | Upjohn |
| α,α-Diethoxyacetophenone | DEAP | Upjohn |
| | DEAP | Rahn |
| | (2,2-Diethoxy-1-phenyl-ethanone) | |
| α,α-Di-(n-butoxy)-acetophenone | Uvatone 8301 | Upjohn |
| | (2,2-Dibutoxyl-1-phenyl-ethanone) | |
| 1-Hydroxy-cyclohexyl-phenyl keton (HCPK) | Irgacure 184 | Ciba-Geigy |
| α,α-dimethoxy-α-hydroxy acetophenone | Darocur 1173 | Merck (from 1.1.92 Ciba-Geigy) |
| | Micure HP-8 | Miwon |
| | (2-Hydroxy-2-methyl-1-phenyl-propan-1-one) | |
| 1-(4-Isopropylphenyl)-2-hydroxy-2-methyl-propan-1-one | Darocur 1116 | Merck (from 1.1.92 Ciba-Geigy) |
| 1-[4-(2-Hydroxyethoxy)phenyl]-2-hydroxy-2-methylpropan-1-one | Darocur 2959 | Merck (from 1.1.92 Ciba-Geigy) |
| 1:1 mixture | Irgacure 500 | Ciba-Geigy |
| | Blend of 1-hydroxy-cyclohexyl-phenyl ketone and benzophenone | |
| and other benzophenone derivatives | Darocur 4665 | Merck (from 1.1.92 Ciba-Geigy) |
| | Blend of 2-hydroxy-2-methyl-1-phenyl-propan-1-one and benzophenone | |
| | Darocur 1664 | Merck (from 1.1.92 Ciba-Geigy) |
| | Blend of 2-hydroxy-2-methyl-1-phenyl-propan-1-one and 2-isopropyl thioxanthone) | |
| | Darocur 4043 | Merck (from 1.1.92 Ciba-Geigy) |
| | Blend of 2-hydroxy-2-methyl-1-phenyl-propan-1-one 2-isopropyl-thioxanthone and 1-(4-dimethyl-aminophenyl)-ethanone | |
| 2-Methyl-1-[4-(methylthio)phenyl]-2-morpholino-propan-1-one | Irgacure 907 | Ciba-Geigy |
| 2-Benzyl-2-dimethylamino-1-(4-morpholino-phenyl)-butan-1-one | Irgacure 369 | Ciba-Geigy |
| 3,6-Bis(2-methyl-2-morpholino-propanonyl)-9-butyl-carbazole | Florcure A-3 | Floridienne |
| 75% solution in tripropylene-glycoldiacrylate) Poly[2-hydroxy-2-methyl-1-[4-(1-methylvinyl)-phenyl]propan-1-one | Esacure KIP | Fratelli Lamberti |

-continued

| Chemical Nam | Trade Name | Supplier |
|---|---|---|
| 2,4,6-Trimethylbenzoyl-diphenyl-phosphine oxide | Lucirin TPO | BASF |
| Blends of 2,4,6-Trimethylbenzoyl-diphenyl-phosphine oxide and 2-hydroxy-2-methyl-1-phenyl propan-1-one | Darocur 4263 (15:85 mixture) | Merck (from 1.1.92 Ciba-Geigy) |
| | Darocur 4265 (50:50 mixture) | |
| 2,2,2-Trichloro-1-[4-(1,1-dimethylethyl)phenyl]-ethanone | Trigonal P1 | Akzo |
| 2,2-Dichloro-1-(4-phenoxyphenyl)-ethanone | Sandoray 1000 | Sandoz |
| 4,4'-Bis(chloromethyl)-benzophenone | F1-4 | Eastman |
| Phenyl-tribromomethyl-sulphone | BMPS | Seitetsu Kakaku |
| Methyl α-oxo-benzeneacetate | Vicure 55 | Stauffer |
| | Nuyopol P1 3000 Rahn | |
| Benzophenone | Benzophenone | |
| Blend of 2,4,6-trimethyl-benzophenone and benzophenone | Esacure TZT | Fratelli Lamberti |
| Blend of 4-methyl-benzophenone and benzophenone | Photocure 81 | Sunko |
| [4-(4-Methylphenylthio)phenyl]phenylmethanone | Quantacure BMS | International Bio-Synthetics |
| 3,3'-Dimethyl-4-methoxy benzophenone | Kayacure MBP | Nippon Kayaku |
| Methyl 2-benzoylbenzoate | Daitocure OB | Siber Hegner |
| 4-Phenyl-benzophenone | Trigonal 12 | Akzo |
| 4,4'-Bis(dimethylamino)-benzophenone | Michler's ketone | |
| Blend of 2-chloro and 4-chlorothioxanthone | Kayacure CTX | Nippon Kayaku |
| Blend of 2-isopropyl- and 4-isopropylthioxanthone | Darocur ITX (2 isomer only) | Merck |
| | Quantacure ITX | International Bio-Synthetics |
| | Lucirin LR 8771 BASF | |
| | Speedcure ITX | Lambsons Ltd. |
| 2,4-Dimethylthioxanthone | Kayacure RTX | Nippon Kayaku |
| 2,4-Diethylthioxanthone | Kayacure DETX | Nippon Kayaku |
| Benzil | Benzil | |
| 1,7,7-Trimethyl-bicyclo[2.2.1]heptane-2,3-dione | Campherquinone | |
| Blend of benzil and 4-phenyl benzophenone | Trigonal P121 | Akzo |
| 4-Benzoyl-N,N,N-trimethylbenzenemethanaminium chloride | Quantacure BTC | International Bio-Synthetics |
| 2-Hydroxy-3-(4-benzoylphenoxy)-N,N,N-trimethyl-1-propanaminium chloride monohydrate | Quantacure BPQ | International Bio-Synthetics |
| 2-Hydroxy-3-(3,4-dimethyl-9-oxo-9H-thioxanthon-2-yloxy)-N,N,N-trimethyl-1-propanminium chloride | Quantacure QTX | International Bio-Synthetics |
| 4-(13-Acryloyl-1,4,7,10,13-pentaoxatridecyl)-benzophenone | Uvecryl P36 | UCB |
| 4-Benzoyl-N,N-dimethyl-N-[2-(1-oxo-2-propenyl)-oxyl[ethylbenzenemethanaminium chloride | Quantacure ABQ | International Bio-Synthetics |
| methyldiethanolamine | | |
| triethanolamine | | |
| Ethyl 4-(dimethylamino)benzoate | Quantacure EPD | International Bio-Synthetics |
| | Kayacure EPA | Nippon Kayaku |
| | Nuvopol EMBO | Rahn |
| | Speedcure EDB | Lambsons Ltd. |
| 2-n-Butoxyethyl 4-(dimethylamino)benzoate | Quantacure BEA | International Bio-Synthetics |
| | Speedcure BEDB | Lambsons Ltd. |
| Isoacryl 4-(dimethylamino)benzoate | Kayacure DMBI | Nippon Kayaku |
| 2-(dimethylamino)ethyl benzoate | Quantacure DMB | International Bio-Synthetics |
| 1-(4-Dimethylaminophenyl)-ethanone | PPA | Siber Hegner |
| Unsaturated copolymerisable tertiary amines (structures not revealed) | Uvecryl P 101 | |
| | Uvecryl P 104 | UCB |
| | Uvecryl P 105 | Radcure |
| | Uvecryl P 115 | Specialties |
| Copolymerisable amine acrylates (structures not revealed) | Photomer 4116 | Harcros |
| | Photomer 4182 | Harcros |
| | Laromer LR 8812 BASF | |
| Bis(γ⁵-cyclopentadienyl)bis[2,6-difluoro-3-(1H-pyrr-1-yl)phenyl]-titanium | Irgacure 784 | Ciba-Geigy |

| Chemical Name | Comments | Tradename | Supplier |
|---|---|---|---|
| | mixture of sulphonium salts (1) | Cyracure UVI-6990 | Union Carbide |
| | mixture of sulphonium salts (2) | Cyracure UVI-6974 | Union Carbide |
| Bis[4- | 30–40% solution in propylene | Degacure | Degussa |

| Chemical Name | Comments | Tradename | Supplier |
|---|---|---|---|
| (diphenylsulphonio)-phenyl[sulphide bis-hexafluorophosphate | carbonate | KI 85 | |
| Bis[4-(diphenylsulphonio)-phenyl]sulphide bis-hexafluorophosphate | 33% solution in propylene carbonate | SP-55 | Asahi Denka |
| Bis[4-(di-(4-(2-hydroxy-ethyl)phenyl)sulphonio-phenyl]sulphide bis-hexafluorophosphate | 27% solution in propylene carbonate | SP-150 | Asahi Denka |
| Bis[4-(di-(4-(2-hydroxy-ethyl)phenyl)sulphonio)-phenyl]sulphide bis-hexafluoroantinomate | 60% solution in propylene carbonate | SP-170 | Asahi Denka |
| $\eta^5$-2,4-(Cyclopenta-dienyl)[(1,2,3,4,5,6-$\eta$)-(methylethyl)-benzene]-iron(II)hexa-fluorophosphate | | Irgacure 261 | Ciba-Geigy |

Other examples of suitable free-radical photoinitiators are described by K. Dietliker in *Chemistry and Technology of UV and EB Formulation for Coatings, Inks & Paints*, Vol. III, Selective Industrial Training Associates Ltd., London, U.K. (1991). Still others include the benzoin derivatives, benzoin ethers, acetophenone derivatives, azo-bis-isobutyronitrile, thioxanones and aromatic ketones of the formula:

wherein $R_1$—$R_5$=H, $C_1$–$C_{10}$ alkyl and $C_1$–$C_{10}$ aryl, an example being Igracure 907 by Ciba Geigy, described in "Radiation Curing of Polymers", *The Royal Society of Chemistry*, 1987, pp. 184–195.

Examples of suitable cationic photoinitiators are aryldiazonium salts, diaryliodonium salts, triarylsulfonium salts and triarylselenonium salts. Representative formulas are given below.

Aryldiazonium salts of the formula

Diaryliodonium salts of the formulae including

Triarylsulphonium salts of the formulae

Triarylselenonium salts of the formula

Dialkylphenacylsulphonium salts of the formula

Aryloxydiarylsulphoxonium salts of the formula

Dialylphenacylsulphoxonium salts of the formula wherein Ar is phenyl or naphthyl, R is a $C_{1-10}$ hydrocarbon based moiety and X is a counter ion, typically $SbF_6^-$, $AsF_6^-$, $PF_6^-$ or $BF_6^-$. Other suitable cationic photoinitiators include iron arene complexes (Igracure™ 261 by Ciba Geigy), nitrobenzyl triarylsilyl ethers, triarylsilyl peroxides and acylsilanes.

Typically, the photochemical decomposition products of cationic photoinitiators do not initiate the cationic polymerization directly. The decomposition products undergo further thermal reactions to produce the strong acid initiator, $H^+X^-$. For example, the iodonium cation produced from photodegradation of diaryliodonium salts does not initiate polymerization but the strong acid generated therefrom does. Free radicals are also formed during this process, which indicates that iodonium salts can simultaneously cure via a free radical mechanism and a cationic mechanism.

The nature of the anion of the strong acid has a dramatic effect on the rate and extent of cationic polymerization. Nucleophilic anions compete with the monomers for the active cations during the polymerization. Very weakly (non) nucleophilic anions are required as counter ions in successful photoinitiators. The counter ions in common commercial use today are, in order reactivity toward cationic polymerization for the same photoreactive cation, $SbF_6^- > AsF_6^- > PF_6^- > BF_4^-$.

The photo initiator used may be a single compound, a mixture of two or more active compounds or a combination of two or more different initiating compounds, i.e., a cationic photo initiator with a free radical initiator which forms part of a multi-component initiating system or two cationic photoinitiators or two free-radical photoinitiators. For example, a combination of diaryl iodonium cation and tetrakis(pentafluorophenyl)borate anion can be used. Combinations of photoinitiators can be used to provide a dual cure or a single compound can provide a dual cure as in the case of the diaryliodonium salts discussed above.

The photo initiator is preferably incorporated in an amount of from 0.01–10 wt. %, based on the total weight of the adhesive formulation, most preferably about 1.0 wt. % of the total adhesive formulation. When the amount of photo initiator is too small, cure is insufficient and where an excessive amount is used, rapid cure results in a decrease in molecular weight. Both conditions result in poor adhesion limiting the durability of the resulting thermal stencil master sheets.

A photosensitizer may be optionally be used with the photo initiator in amounts of from 0.01 to 5 wt. %, based on the total weight of the adhesive formulation. The sensitizers modify the absorption spectrum of a photoinitiating package. Sensitizers absorb light and are promoted to an excited state and are then able to transfer this energy to another molecule, usually the photo initiator. This, in turn, promotes the photo initiator to an excited state and the photochemical reaction occurs as if the photo initiator had been directly excited by a photon. The structure of the photosensitizer remains unchanged. Photosensitizers are often added to shift the light absorption characteristics of a system. An example of a photosensitizer for cationic polymerizations is anthracene, which is used with the diphenyliodonium cation. Other suitable examples of photosensitizers for cationic cures include perylene, phenothiazine, xanthone, thioxanthone and benzophenone.

Optionally, a photopolymerization initiation assistant may also be used. This is an agent which is not activated itself by ultraviolet radiation but which, when used with a photopolymerization initiator, helps the initiator speed up the initiation of polymerization; thus, realizing a more efficient cure.

The adhesive formulations of the present invention can comprise over 99 wt. % photopolymerizable monomer and/or oligomer, the balance being photo initiator material. These photopolymerizable monomers and oligomers are liquid at 50° C. and preferably liquid at ambient temperature. The coating formulations of the present invention have at least 25 wt. % photopolymerizable monomer and/or oligomer to provide sufficient bonding. Preferred levels will depend on the monomers used, their reactivity and other components therein. Amounts of photopolymerizing monomer and/or oligomer ranging from 50 wt. % –99 wt. % are generally preferred. In addition to these "liquid" photopolymerizable monomers and/or oligomers, the adhesive formulations may comprise reactive solid polymers which participate in the polymerization.

The photopolymerizable monomers and oligomers described above polymerize by either a cationic mechanism or free-radical mechanism or both to form a polymer which softens and flows at a temperature below 260° C. but is sufficiently crosslinked to be resistant to swelling when exposed to printing inks.

Cationically polymerizable monomers and oligomers preferred for use in these adhesive formulations and include those selected from the group consisting of epoxies, vinyl ethers, cyclic ethers, cyclic thioethers and vinyl functional hydrocarbons. The epoxy monomers and oligomers have at least one oxirane moiety of the formula.

The epoxies are particularly preferred monomers and oligomers used in the present invention.

Other cyclic ethers suitable for use in the present invention include butylene oxides with structural units of the formula:

pentylene oxides with structural units of the formula:

thiopropylenes with structural units of the formula:

1,3,5-trioxanes with structural units of the formula:

hexyl lactones with structural units of the formula:

and 1,4,6,9-tetraoxaesperononanes with structural units of the formula:

Other particularly preferred cationically photopolymerizable monomers and oligomers are the vinyl ether monomers and oligomers. Conventional vinyl ether monomers and oligomers which have at least one vinyl ether group —O—CR'=CRH, wherein R and R' are each, independently, H or $C_{1-8}$-alkyl, are suitable. Suitable vinyl ether monomers and oligomers vary widely in structure and performance. Those with vinyl ether groups where both R and R'=H are preferred.

Epoxy monomers and oligomers and vinyl ether monomers and oligomers with two or more reactive groups can be used to increase crosslinking. Mixtures of epoxy and vinyl ether monomers and oligomers may also be used.

Specific examples of suitable epoxy monomers and oligomers include the "1,2-cyclic ethers" disclosed in U.S. Pat. No. No. 5,437,964 and those described in *Ring-Opening Polymerizations*, Vol. 2, by Frisch and Reegan, Marcel Dekker, Inc. (1969). Suitable epoxies are aliphatic, cycloaliphatic, aromatic or heterocyclic and will typically have an epoxy equivalency of from 1 to 6, preferably 1 to 3. Suitable examples include propylene oxide, styrene oxide, vinylcyclohexene oxide, vinylcyclohexene dioxide, glycidol, butadiene oxide, diglycidyl ether of bisphenol A, oxetane, octylene oxide, phenyl glycidyl ether, 1,2-butane oxide, cyclohexeneoxide, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybuta-diene, 1,4-butanediol diglycidyl ether, polyglycidyl ether of phenolformaldehyde resole or novolak resin, resorcinol diglycidyl ether, epoxy silicones, e.g., dimethylsiloxanes having cycloaliphatic epoxide or glycidyl ether groups, aliphatic epoxy modified with propylene glycol and dipentene dioxide.

A wide variety of commercial epoxy resins are available and listed in *Handbook of Epoxy Resins* by Lee and Neville, McGraw Hill Book Company, New York (1967) and in *Epoxy Resin Technology* by P. f. Bruins, John Wiley & Sons, New York (1968).

Preferred epoxies include:

(1) monofunctional epoxy monomers/oligomers such as epoxy grafted polyesters (Vikopol 24, Vikopol 26 by Elf Atochem), cycloaliphatic monoepoxies, such as those of the formulae and and mixtures of cycloaliphatic monoepoxies available from Union Carbide under the trade name UVR 6100 having an epoxy equivalent weight of 130 to 140, limonene monoxide, epoxidized alpha olefins of the formula when n=1–30$^+$, silicone epoxy oligomers, alpha pinene oxide, and the like;

(2) bifunctional monomers such as limonene dioxide, bisphenol-A epoxy, cycloaliphatic diepoxides such as bis(3,4-epoxycyclohexyl)adipate of formula (a)

(a)

and 3,4-epoxycyclohexylmethyl-3,4-epoxycyclohexane carboxylate (commercially available from Union Carbide under the trade name Cyracure® and from Sartomer under the trade name Sarcat® of formula (b)

(b)

and the like; and (3) polyfunctional monomers such as those of general formula (c), including epoxidized polybutene, epoxidized soybean oil, linseed fatty acid esters and the like.

(c)

Vinyl Ether Monomers

Examples of suitable monomers and oligomers having at least one or more vinyl ether groups include those disclosed in U.S. Pat. No. 4,950,696 and those of the following general formula:

where

R and R' are each, independently H or $C_{1-8}$ alkyl,

Z' is a direct bond or a divalent moiety having $C_{1-20}$ carbon atoms selected from the group consisting of alkylene, cycloalkylene, or polyalkylene ether moieties, n is an integer from 1 to 4,

B is hydrogen or a moiety derived from aromatic and aliphatic hydrocarbons, alcohols, cycloaliphatic hydrocarbons, esters, ethers, siloxanes, urethanes, and carbonates, of from 1 to 40 carbon atoms.

Monofunctional monomers are those which have n=1, while the multifunctional monomers are those which have n=2 to 4.

Suitable vinyl ether monomers can also be defined by the following specific formulae:

a) Vinyl ether terminated aliphatic monomers of the formula where n is 1 to 4, m is 0 to 5, and $M_2$ is a mono, di, tri, or tetra functional aliphatic or cycloaliphatic moiety having from 4–40 carbon atoms;

Z is a divalent moiety having $C_{1-20}$ carbon atoms selected from the group consisting of alkylene, cycloalkylene or polyalkylene moieties, and R and R' are each, independently, H or $C_{1-8}$ alkyl.

Preferred are mono and difunctional vinyl ethers based on normal alkanes having the general formula:

wherein y=1 to 18

R=—H, or $C_{1-8}$ alkyl

R'=—H, or $C_{1-8}$ alkyl

R"=—H, —OH, or —O—CR'=CHR;

mono and difunctional vinyl ethers based on ethylene glycol having the general formula:

wherein y=1 to 6 and

R, R' and R" are as defined above; and mono and difunctional vinyl ethers based on 1,3-propanediol and 1,4-butanediol having the general formula:

wherein x=3 or 4 y=1 to 6 and

R, R' and R" are as defined above.

b) Vinyl ether terminated ester monomers of the formula where n is 1 to 4,

$M_1$ is a mono, di, tri, or tetra functional moiety having from 1–15 carbon atoms selected from the group consisting of alkylene, arylene, aralkylene and cycloalkylene moieties, Z is a divalent moiety having $C_{1-20}$ carbon atoms selected from the group consisting of alkylene, cycloalkylene, or polyalkylene ether moieties, R and R' are each, independently, a monovalent moiety selected from the group consisting of H and alkyl groups having 1–8 carbon atoms.

c) Vinyl ether terminated ether monomers derived from ether compounds such as HO—$[CH_2CH_2O]_m$H, wherein m is 2–5.

d) Vinyl ether terminated aromatic monomers of the formula where n is 1 to 4, and $M_3$ is a mono, di, tri, or tetrafunctional aromatic moiety having 6 to 40 carbon atoms; and Z, R' and R" are as defined above.

e) Vinyl ether terminated siloxane monomers of the formula (RCH=CR'O—Z')$_n$—A, wherein A is a polysiloxane with from 4 to 15 silicon atoms;

n=1–4 and

R, R' and Z' are as defined above.

f) Vinyl ether terminated carbonate monomers of the formula wherein x is a diester, diol or polyol moiety of from 2 to 20 carbon atoms, n is 1–4, p is 0 to 3, and

R, R' and Z are as defined above.

Specific vinyl ethers which are suitable include a) bisphenol A derivatives and other aromatic vinyl ethers of the formulae (1) and (2):

(1)

where x is 2 or 4, y is 2 or 3;

(2)

where y is 2 b) ester derived divinyl ethers of the formulae (3) and (4):

(3)

where x is 2, 3, or 4,
y is 2 or 4; and (4)

where x is 2, 3, or 4 c) cycloaliphatic diol derived vinyl ethers of formula (5):

(5)

wherein R''' is H, OH or O—CH=CH$_2$, d) poly ether derived vinyl ethers of the formulae (6) and (7):

(6)

where x is 2, 3, or 4
and R''' is H, OH or —O—CH=CH$_2$, (7)

and e) phenol derived vinyl ethers of the formulae (8) and (9)

(8)

(9)

where R is H or CH$_3$.

Common vinyl ether monomers which are suitable include ethyl vinyl ether, propyl vinyl ether, isobutyl vinyl ether, octadecyl vinyl ether, hydroxybutyl vinyl ether, propenyl ether of propylene carbonate, dodecyl vinyl ether, cyclohexyl vinyl ether, 2-ethylhexyl vinyl ether, butyl vinyl ether, ethyleneglycol monovinyl ether, diethyleneglycol divinyl ether, butanediol monovinyl ether, butane diol divinyl ether, hexane diol divinyl ether, ethylene glycol butyl vinyl ether, triethylene glycol methyl vinyl ether, cyclohexane dimethanol monovinyl ether, cyclohexane dimethanol divinyl ether, 2-ethylhexyl vinyl ether, poly-THF divinyl ether, CRH=CR—[O(CH$_2$)$_4$—O]$_n$—CR=CRH, pluriol-E-200-vinyl ether, CRH=CR—[O—CH$_2$—CH$_2$]$_n$—O—CR=CRH and the like.

As indicated above, photopolymerizable monomers and oligomers which polymerize by a free radical cure can also be used in the adhesive formulations of the present invention. The monomers and oligomers which polymerize by free radical polymerization are typically sensitive to light such that exposure to ambient light must be avoided when preparing the thermal stencil master sheets herein.

Examples of suitable free-radical photopolymerizing monomers and oligomers include acrylate monomers, methacrylate monomers, acrylic acids, methacrylic acids, epoxy acrylates and epoxy methacrylates. These monomers and oligomers can cure by a dual cure mechanism. Other dual cure systems, i.e., UV and thermal, are also suitable where the thermal cure is provided by separate components.

The acrylates, methacrylates, acrylic acids and methacrylic acids have at least one functional group that conforms to the general formula B below:

B wherein R, R$_1$, R$_2$ and R$_3$=H or a hydrocarbon based radical. The acrylates and methacrylates (R$_1$=a hydrocarbon based radical) are preferred over the acrylic acids and methacrylic acids (®=H). Preferred acrylates are methyl methacrylate and ethyl methacrylate monomers. Hydrocarbon based radicals of R and R$^1$ include methyl, ethyl, propyl, isopropyl, n-butyl, sec-butyl, isobutyl, tert-butyl, hexyl, heptyl, 2-heptyl, 2-ethylhexyl, 2-ethylbutyl, dodecyl, hexadecyl, 2-ethoxyethyl, isobornyl and cyclohexyl. The preferred acrylates are those wherein R and R$^1$ are selected from the C$_1$–C$_6$ series and R$^2$ is H. Monomers with two or more functional groups of formula B can also be used as well as the following oligomers: acrylated amines, polyester acrylates, urethane acrylates, polyether acrylates and acrylated polybutadiene. Other monomers having unsaturated carbon-carbon double bonds can be used in a minor portion with the acrylic acids, acrylates, methacrylates and methacrylic acids. These include styrene, vinyl acetate, vinyl chloride, vinylidene chloride, butadiene, isoprene, propylene, vinyl alcohol and the like.

The adhesive formulations used in invention optionally contain another component. This can comprise one or more waxes and/or one or more thermoplastic resins. Examples of preferred waxes are carnauba wax under the Slip-Ayd series of surface conditioners by Daniel Products Co. and low molecular weight polyethylene. The wax can enhance the thermal perforation characteristics of the adhesive layer but may reduce chemical resistance to the printing inks. Therefore, the amount of wax used in the adhesive formulations preferably does not exceed 25 wt. %.

The adhesive formulations used in this invention may optionally contain one or more thermoplastic resins which can be either reactive or non-reactive, i.e. the thermoplastic resin participates or does not participate in the photopolymerization reaction. Suitable non-reactive thermoplastic resins include those used in conventional adhesive formulations and the following: polyvinyl chloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polystyrene, styrene copolymers, polyamide, ethylcellulose, epoxy resin, polyketone resin, terpene resin, petroleum resin, polyurethane resin, polyvinyl butyryl, styrene-butadiene rubber, nitrile rubber, acrylic rubber, ethylene-propylene rubber, ethylene alkyl (meth)acrylate copolymer, styrene-alkyl (meth) acrylate copolymer, acrylic acid-ethylene-vinyl acetate terpolymer, saturated polyesters and sucrose benzoate.

Reactive thermoplastic resins include free-radical photopolymerizable polymers such as aromatic urethane acrylates, aliphatic urethane acrylates, polyester acrylates, acrylated amines, acrylated polybutadiene and polyether acrylates.

The response of the adhesive layer in the thermal stencil master sheet to the heat from a thermal transfer print head can be adjusted by controlling the flow temperature (glass transition temperature/softening temperature) and the degree of crosslinking of the polymer formed and by adjusting the proportion and identity of other binder components in the formulation. Mixtures of photo-curable monomers and oligomers can be used to modify the properties (flow temperature and crosslinking) of the resultant polymer. The structure of the polymer obtained can vary from a linear thermoplastic to polymers with increased crosslinking up to a highly crosslinked thermoset. However, thermoset properties are not desired. Therefore, crosslinking must be limited to some extent.

Monofunctional monomers typically polymerize to form thermoplastic polymers, while multifunctional monomers or oligomers will form thermosets due to the larger number of reactive sites per polymerizing unit. Where a mixture of monofunctional monomers are used, random copolymers are formed. The glass transition temperature (Tg) of a linear copolymer can typically be varied by adjusting the ratio of monomers. The glass transition temperature ($Tg_R$) of a random copolymer can be predicted by the equation:

$$\left(\frac{1}{Tg}\right)_R = W_2 \left(\frac{1}{Tg}\right)_1 W_1 \left(\frac{1}{Tg}\right)_2$$

wherein $W_1$ and $W_2$ are weight fractions of components 1 and 2, and $(1/Tg)_1$ and $(1/Tg)_2$ are the reciprocal values for glass transition temperatures of the respective homopolymers of each monomer.

If desirable, monofunctional, difunctional or multifunctional alcohols can be added to the adhesive formulation for incorporation into the backbone of the polymers formed to help control crosslinking and Tg. The multifunctional alcohols provide crosslinking sites. The difunctional alcohols provide chain extension and monofunctional alcohols provide chain transfer and can serve to terminate polymer chains and control molecular weight. Short polymer chain lengths provided by the use of high levels of monofunctional alcohol during polymerization will reduce Tg values. Each growing polymer chain can be terminated by an alcohol. This forms an ether linkage and liberates a proton. This proton is free to initiate a new cationic chain reaction. The addition of alcohols into an epoxy cationic polymerization process increases the speed of reaction. This is attributed to the greater mobility of the proton as compared to the cations of the growing polymer chains. It is common practice to add a small amount of alcohol to a formulation to speed up the cationic reaction.

A number of alcohols are manufactured specifically for incorporation into cationically cured epoxies. Typical examples include the TONE polyols, diethylene glycol, triethylene glycol, dipropylene glycol and polyether polyols. Mono- and difunctional alcohols having molecular weights in the range of 3,000 to 4,000 function very well in UV cationically cured systems. Such alcohols can form block copolymers with epoxy monomers. The difunctional alcohols form ABA block copolymers. With these large molecular weight alcohols, the cationic polymerizations of the epoxy monomers build on alcohol groups instead of on the epoxy groups.

The flow temperature of the adhesive for the thermal stencil master sheet of the present invention after photocuring is preferably in the range of 100° C. to 260° C. If the flow temperature is too high, thermal perforation when marking the stencil master is not complete so that the quality of the resultant printed image is poor.

The viscosity of the adhesive formulation is not of great concern. The adhesive formulations are typically low in viscosity since a principle component is a UV or visible light curing monomer or oligomer. Where permeation of the porous substrate by the adhesive formulation is excessive, the adhesive formulation can be applied to the thermoplastic resin film, as an alternative. The cured adhesive formulation preferably has a viscosity of 10,000 cps or higher. If the viscosity is too low, the cured adhesive may flow, causing unevenness of the adhesive layer and the thermal stencil master sheet.

Conventional fillers, plasticisers, flexibilizers, surfactants, defoaming agents, flow adjusters or leveling agents may also be incorporated to improve the properties or reduce the cost of the adhesive layer provided they are not basic where a cationic photopolymerization initiator is added. Any basic material will quench the cations and prevent polymerization. Illustrative examples of flow adjusters are low molecular weight organopolysiloxanes such as methylpolysiloxanes which may be used in an amount of 0.01–10 wt. % based on weight of the total adhesive formulation. An illustrative example of a defoamer, i.e., a surfactant, is Anti-Musal JIC, which may be used in an amount of 0.01–10 wt. % based on the weight of the total adhesive formulation. Illustrative examples of leveling agents are low molecular weight polysiloxane/polyether copolymers and modified organic polysiloxanes, which may be used in an amount of 0.01–5 wt. % based on the weight of the total adhesive formulation.

Other suitable additives for the adhesive formulations are photostabilizers which prevent polymerization of the adhesive by natural or ambient light where the photoinitiator is activated by UV radiation.

The above components can be mixed and dispersed uniformly by an appropriate means such as a simple impeller within a tank or similar vessel or a roll mill to obtain the adhesive formulation used in the present invention.

They are well suited for adhering to both a porous substrate and thermoplastic resin film and show little or no adhesive failures between these substrates by stress or strain with the deformation of the thermal stencil master sheet.

The thermal stencil master sheets of the present invention additionally comprise a thermoplastic resin film. A suitable thermoplastic resin film for the thermal stencil master sheet is one that (1) can form thin films that are perforatable by an activated thermal transfer print head and yet sufficiently strong to withstand processing and handling during printing and (2) do not swell or solubilize in the presence of printing inks. Examples include those conventionally employed in thermal stencil master sheets such as highly oriented or stretched films, such as films of polyesters, polyvinyl chloride, vinylidene chloride-vinyl chloride copolymers, copolymers composed mainly of propylene, polyester (PET) films and polyvinylidene chloride films are preferred. Suitable polyester-type plastic materials include 6–40 gauge polyester film manufactured by Dupont under the trademark Mylar®. Other films include polyethylene naphthalate films, polyamide films such as nylon, polyolefin films such as polypropylene film, cellulose films such as triacetate film and polycarbonate films are also suitable. The thermoplastic films preferably have high tensile strength to provide ease in handling, coating and printing and preferably provide these properties at minimum thickness and low heat resistance to provide good perforation properties when exposed to activated heating elements within thermal print heads. The thickness is preferably 0.5 to 6 microns. If desired, thermoplastic resin may be provided with a backcoating on the surface opposite the adhesive layer to simplify printing. The backcoating comprises a silicone coating to minimize resistance. The backcoatings used in conventional thermal stencil master sheets can also be used herein.

The thermal stencil master sheets of the present invention additionally include a porous substrate. Suitable porous substrates are comprised of a porous material which is stable and not perforated by an activated print head of a thermal transfer printer. The porous substrate must also allow ink to pass and flow therethrough. Preferred examples of such substrates are those used in conventional thermal stencil master sheets and include thin papers of natural or synthetic fiber such as Manila hemp, polyester fibers and like; nonwoven fabrics of polyester fibers, or screen plain gauze of polyester fibers, silk and the like. Preferred thicknesses range from 15 to 55 microns.

The amount of the adhesive formulation coated on either the porous substrate or thermoplastic resin film is preferably in the range of 0.3–2.5 g/m$^2$. If the amount applied is too low, the adhesive force is reduced so that the film is easily peeled off from the porous substrate, while, if it is too high, the thermal perforation suffers so that the quality of the resulting image size is poor.

When the thermoplastic resin film is bonded to the porous substrate with the UV or visible light cured adhesive, it is often preferable to additionally incorporate contact bonding under a pressure. By employing a pressure, the porous substrate is embedded in the adhesive layer to improve the perforatability and adhesion when the image is imprinted to complete the thermal stencil master sheet. This ultimately improves the resolution of the printed image. As to this pressure operation, any conventional process which can pressurize the adhesion surface uniformly may be employed, such as those which employ press rolls.

The thermal stencil master sheets of the present invention can be prepared by the method of this invention which comprises forming a liquid layer between a porous substrate and thermoplastic resin film with an adhesive composition. Preferably, conventional coating equipment is used in darkness. The photopolymerizable oligomers and monomers in the liquid layer of adhesive formulation are then cured to form a solid layer by exposure to UV or visible light.

Suitable light sources for curing the layer of adhesive formulation depend on the photoinitiator used. Those responsive to visible light can be cured by ambient light from conventional incandescent light bulbs, fluorescent light bulbs or sun light. Those photoinitiators responsive to the UV light can be activated by high and medium pressure mercury lamps, xenon-lamps, arc lamps and gallium lamps and the like.

Figure 1:
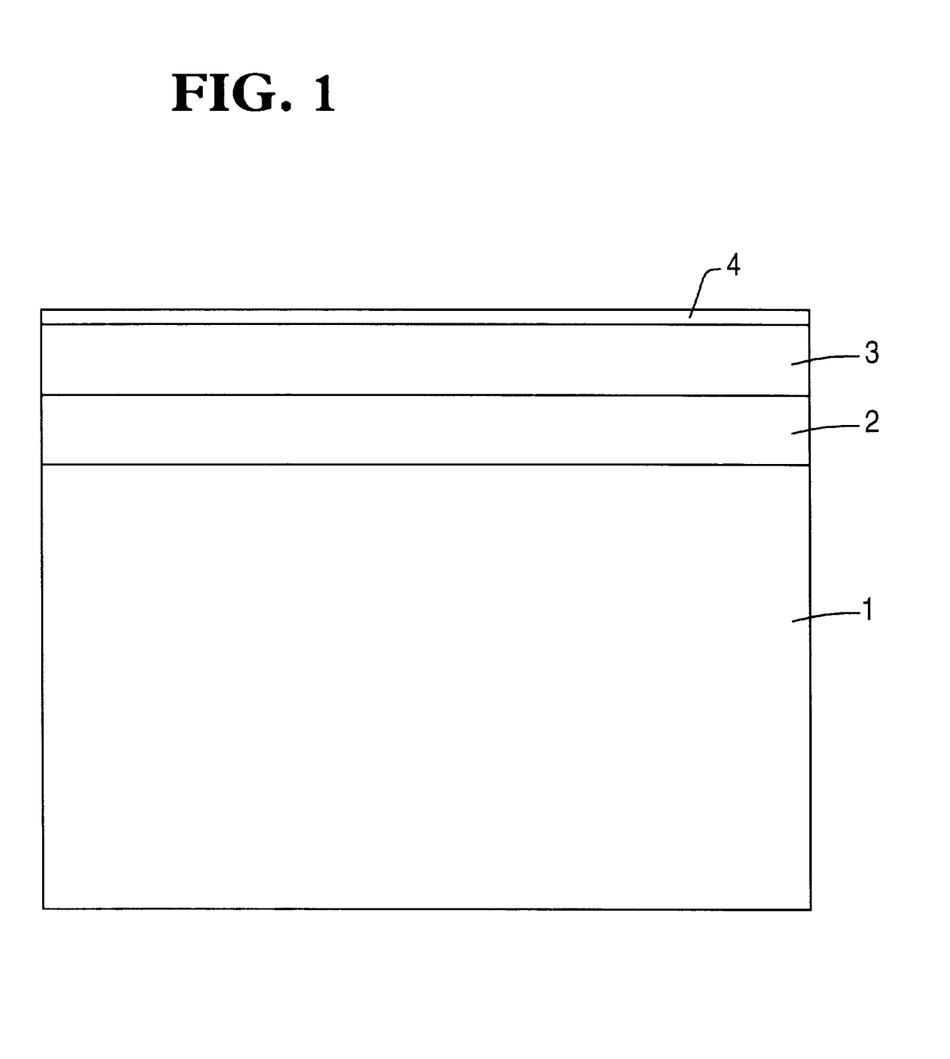
FIG. 1 is a schematic representation of a thermal stencil master sheet of the present invention.
Figure 2A:
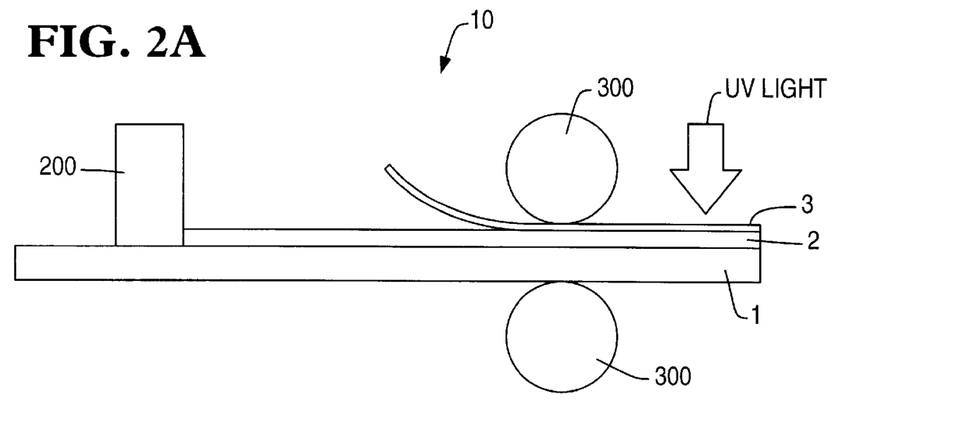
FIGS. 2a–2c are schematic representations of coating equipment which can perform the methods of this invention for preparing thermal stencil transfer sheets.
Figure 2B:
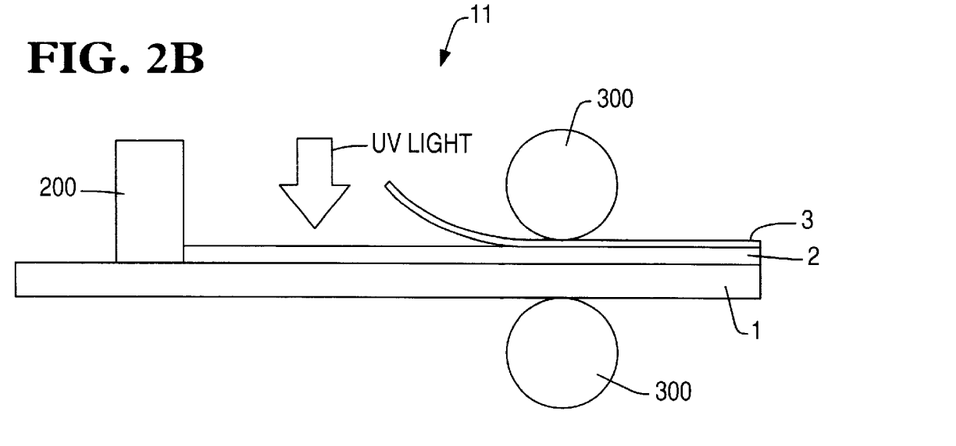
Figure 2C:
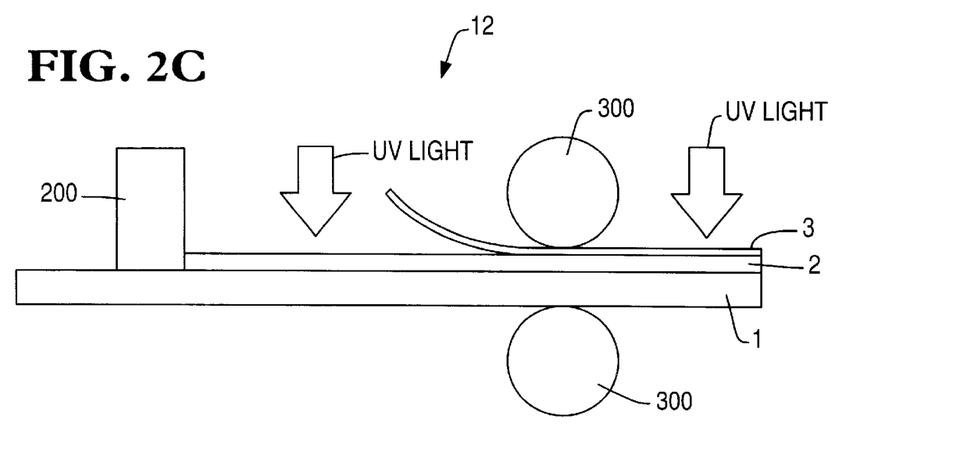

One of the embodiments of the process for producing the master sheet of the present invention will be described below. An adhesive formulation as described above is uniformly coated on a porous substrate by means of a bar such as a Meyer rod. A transparent hermoplastic sheet is overlayed upon the adhesive coated porous substrate. This adhesive coating is irradiated with UV light through the transparent thermoplastic sheet. After irradiation, a metal roll is applied to the laminate applying a pressure thereto. Optionally, a releasing agent is coated onto the transparent thermoplastic sheet to obtain the master sheet of the present invention. The thermal stencil master sheet obtained is in a form wherein porous substrate 1 is partially embedded in adhesive layer 2, and thermoplastic synthetic resin film 3 is adhered to adhesive layer 2. Releasing agent layer 4 is adhered onto to thermoplastic resin film 3, as shown in FIG. 1. Since a portion of the porous substrate is embedded in adhesive layer 2, the adhesion is improved and also the endurance of the thermal stencil master sheet is improved with increased resistance to solvent. Since the adhesive layer is similarly constituted, the perforatability is improved and it is possible to obtain improved resolving power. The embodiment described above can be prepared from a curing apparatus 10 as illustrated in FIG. 2a. The adhesive layer 2 applied to porous substrate 1 by coater head 200 and is cured subsequent to lamination of the thermoplastic resin film 3 by rollers 300. In another embodiment of the process of the present invention, the adhesive coating on the porous substrate is irradiated before the thermoplastic resin film is overlayed thereon. Curing apparatus 11, which performs such a process, is illustrated in FIG. 2b. In a further embodiment of the process of the present invention, the adhesive coating is irradiated before and after the thermoplastic resin film and porous substrate are laminated together. Such a process can be performed by curing apparatus 12 illustrated in FIG. 2c. Although not illustrated in FIGS. 2a–c, it is contemplated that the thermoplastic resin film can be coated first with the adhesive formulation instead of the porous substrate.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight. All publications and patents cited above and below are hereby incorporated by reference.

EXPERIMENTAL

Adhesive Formulation I

An adhesive formulation for use in the present invention is prepared by combining the following components. The photoinitiator is added last, preferably in darkness.

| Component | Function | Amount (wt. %) |
|---|---|---|
| Vikolox 12[2] | Epoxy monomer | 9 → 58 |
| UVR 6100[3] | Epoxy monomer | 38 → 87 |
| CD-1012[1] | Photonitiator | up to 8 |

[1]CD-1012, Diaryliodonium
Hexafluoroantimonate
Sartomer Company, Inc
Oaklands Corporate Center
502 Thomas Jones Way
Exton, Penhsylvania 19341
[2]Vikolox 12
Elf Atochem North America
Specialty Epoxides
2000 Market Street
Philadelphia, PA 19103
[3]Cyracure UVR-6100,
Mixed cycloaliphatic epoxies (monofunctional)
Union Carbide
Solvents and coatings Materials Division
39 Old Ridgebury Road
Danbury, CT 06817-0001

The resulting coating formulation has a solids content of 100%.

Thermal Stencil Master Sheet

A film of the adhesive formulation of Example 1 is applied to a glass plate with a wood applicator and is exposed to ultraviolet light from a non-doped Mercury Arc lamp at an intensity of 300 watts/in for 3 seconds, while traveling 15–20 ft./min. in a U.V. cabinet from U.V. Process Supply Inc., 4001 North Ravenswood Avenue, Chicago, Ill. 60613. The film is not tacky and shows good adhesion to the substrate.

The liquid adhesive formulation can be applied between a polyester film and porous substrate at a coat weight that is conventional for thermal stencil master sheets and cured. This stencil master can be fed through a conventional digital stencil printer to produce perforations therein of suitable print resolution and integrity.

The preceding example can be repeated with similar success by substituting the generically or specifically described reactants and/or operating conditions of this invention for those used in the preceding example.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A thermal stencil master sheet which comprises:

a) a porous substrate, b) a polyethylene terephthalate film, and c) an adhesive which comprises a thermoplastic resin derived from:

i) monofunctional monomers selected from the group consisting of cycloaliphatic monoepoxies, epoxidized alphaolefins, limonene monoxide and epoxidized polybutadiene;

ii) bifunctional monomers and oligomers selected from the group consisting of bis(3,4-epoxycyclohexyl) adipate, limonene dioxide, bisphenyl epoxy and 3,4-epoxycyclohexylmethyl-3,4-epoxycyclohexane carboxylate; and iii) polyfunctional monomers and oligomers selected from the group consisting of epoxidized soy bean oil and linseed fatty acid esters, wherein at least 25 wt. % of the adhesive comprises said thermoplastic resin formed from said monofunctional monomer, bifunctional monomers, bifunctional oligomers, poly functional monomers and poly functional oligomers.

2. A thermal stencil master sheet of claim 1, wherein the amount of the adhesive ranges from 0.3 to 2.5 g/m$^2$.

3. A thermal stencil master sheet as in claim 1, wherein the thermoplastic resin formed from monomers, oligomers or mixtures thereof comprises more than 99% of said adhesive.

4. A thermal stencil master sheet as in claim 1, wherein the porous substrate is comprised of polyester fibers.

5. A thermal stencil master sheet as in claim 1, wherein said adhesive additionally contains monomers or oligomers which have polymerized when exposed to heat.

6. A thermal stencil master sheet as in claim 1, wherein the monomer, oligomer or mixture thereof is selected from the group consisting of epoxies.

7. A thermal stencil master sheet as in claim 1, wherein the adhesive additionally comprises a photosensitizer.

8. A thermal stencil master sheet as in claim 1, wherein said adhesive additionally comprises a cationic photoinitiator selected from the group consisting of diaryliodonium salts, triarylsulphonium salts, triarylselenonium salts, dialkylphenacylsulphonium salts, aryloxydiarylsulphoxonium salts and dialylphenacylsulphoxonium salts.

9. A thermal stencil master sheet as in claim 1, wherein said thermoplastic resin has a thickness of 0.5 to 6 microns and the porous substrate has a thickness of 5 to 55 microns.

10. A thermal stencil master sheet as in claim 1, wherein said thermoplastic resin is additionally formed from a crosslinking agent selected from polyfunctional and multifunctional alcohols.

11. A thermal stencil master sheet as in claim 10, wherein said adhesive has a flow temperature in the range of 100° to 260° C.

12. A thermal stencil master sheet as in claim 1, wherein the monomers and oligomers which form said thermoplastic resin of said adhesive are liquid at 50° C.

13. A thermal stencil master sheet as in claim 1, wherein said polyethylene terephthalate film and adhesive are perforatable by a thermal transfer print head operating at a temperature in the range of 100° to 260° C. and the porous substrate remains intact.

* * * * *